Patented May 10, 1938

2,116,517

UNITED STATES PATENT OFFICE 2,116,517

STIMULATION OF MOLD GROWTH

Wilbie S. Hinegardner, Niagara Falls, N. Y., assignor to E. I. du Pont de Nemours & Company, Wilmington, Del., a corporation of Delaware No Drawing. Application February 20, 1936, Serial No. 64,996

2 Claims. (Cl. 195—77)

This invention relates to the stimulation of mold growth by the use of hydrogen peroxide.

Molds are fungoid growths which usually develop in filamentous masses. Commercially, many types of molds are utilized in the preparation of various chemical compounds. Among the most usual uses of molds in commercial manufacturing operations are the preparation of acids such as gluconic acid and citric acid from sugars and starchy substances. Among the types of molds used in the preparation of these acids are the Penicillium, Aspergillus, Mucor, Sterigmatocystis, and Citromyces. Some specific varieties of these types of molds, e. g., the *Aspergillus niger*, and certain Penicillium such as *P. purpurogenum*, *P. citrinum* and *P. divaricatum*, have been used in the manufacture of chemical compounds. *Aspergillus niger* mold is now employed commercially in large scale production of citric acid, and perhaps to some extent in the production of various other acids such as gluconic.

Some of the processes now in use involve a two-stage process wherein the first stage consists in the growth of the fungus in a special culture medium. Ordinarily the culture medium is inoculated with the mold and a branching body known as a mycelium is developed. In order to attain maximum growth from several days to a week is ordinarily required. In the two-stage process the main body of material which is to be transformed into the desired chemical product is then inoculated with the mold, frequently by cutting up the mycelia bodies and distributing them throughout the solution. Sometimes the nutrient medium is just withdrawn, the mycelioid bodies are washed with water and the main solution substituted for the nutrient medium used to develop the mold.

It is also fairly frequent in commercial practice to employ a single stage process in which both growth of the mold bodies and fermentation of the solution to the desired chemical compound take place in a single stage. Frequently the uniform mycelium structure which is first developed is grown under conditions in which the mold and nutrient material are subjected to oxygen pressure. This is done by enclosing the mold and nutrient medium in a pressure resistant vessel containing oxygen gas and then subjecting the contents to agitation. Agitation is frequently employed, even when the mycelia are developed under atmospheric pressure.

I have now found that the presence of hydrogen peroxide in the nutrient medium in which the mycelioid structure is grown stimulates the growth and causes the mycelium body to attain maximum growth within a shorter period of time. Ordinarily the amount of hydrogen peroxide which should be present will vary from about 0.01 to 0.08% by weight, based upon the weight of the nutrient medium. For maximum stimulation, amounts of hydrogen peroxide ranging from 0.03 to 0.05% appear to be necessary. The amounts specified are amounts of the chemical compound $H_2O_2$. Ordinarily the source of hydrogen peroxide will be a commercial aqueous solution such as the 100 volume solution sold commercially under the trade-mark name "Albone C". Since solutions of 100 volume hydrogen peroxide contain about 27.6% $H_2O_2$ by weight, it is necessary to add to the nutrient medium a sufficient quantity of the hydrogen peroxide solution so that the actual content of $H_2O_2$ in the solution will vary within the limits specified.

My invention does not depend upon the particular culture medium used nor do particular culture media form any part of my invention. Various culture media containing both organic and inorganic compounds have been described in the literature and are now in use, and I have found that hydrogen peroxide will stimulate mold growth regardless of the type or character of the culture medium used. All that is necessary is that there be added to the solution a sufficient quantity of a commercial solution of hydrogen peroxide in order that there may be present from 0.01 to about 0.08% $H_2O_2$, this amount being based upon the total weight of the culture medium.

As examples of my novel process for stimulating the growth of molds generally, and particularly for stimulating the growth of molds such as *Aspergillus niger*, *P. citrinum*, *P. divaricatum*, *P. luteum*, and molds of the Sterigmatocystis and Mucor genera which may be used commercially in the manufacture of various acids such as citric and gluconic acids, the following may be given:—

*Example 1*

A series of samples of orange juice at room temperature were placed in identical narrow bottles of approximately 100 cc. content. Each of these samples of orange juice was then inoculated with the same amount of *Aspergillus niger* mold. To about one-half of the bottles containing orange juice, hydrogen peroxide, in amounts ranging from 0.03 to 0.05% by weight based on the weight of the orange juice, was then added. The molds were then allowed to develop in the orange juice for about two weeks.

As the mold grew in each of the bottles it appeared on the surface of the nutrient medium. As an index of the relative growth of each of the samples of molds the height of the mold growth could be measured with a ruler. After two weeks those samples of orange juice to which no hydrogen peroxide had been added showed an average mold growth of 3 to 4 mm. while those to which hydrogen peroxide in amounts ranging from 0.03 to 0.08% $H_2O_2$ had been added showed an average growth of 8 to 12 mm.

Example 2

Two culture media were prepared using the familiar solution known as "Raulins Solution". This solution is described on page 36 of Thom's textbook, "The Penicillia", published in 1930 by the Williams and Wilkins Company.

Each of these media was then inoculated with a mixture of *Penicillium citrinum* and *Aspergillus niger* molds. To one of these solutions hydrogen peroxide in amount equivalent to about 0.04% $H_2O_2$ was added, this amount being based on the total weight of the culture medium.

Both inoculated culture media were then placed in aluminum lined bombs and subjected to an oxygen pressure of 25 lbs. per square inch. The bombs were placed in a rack which permitted agitation and were allowed to stand for 48 to 50 hours.

At the end of that time the molds in each bomb were transferred to cylinders which permitted measurement of the height of the mold growth. The growth in the medium to which hydrogen peroxide had been added occupied a space of 6 mm. in the cylindrical vessel. The growth in the medium to which no hydrogen peroxide had been added occupied a height of only 2 mm. This indicates the remarkable effect of the hydrogen peroxide in stimulating mold growth and further proves that the stimulation is not due to the action of additional oxygen released by the peroxide.

Example 3

Two samples of Czapek's culture medium were prepared. This medium is described in Thom's "The Penicillia", page 42. To one of these culture media hydrogen peroxide, in amount equivalent to about 0.08% based on the weight of the solution, was added and the other was used for mold growth without the addition of hydrogen peroxide.

Both samples were then inoculated with *Penicillium glaucum* mold and placed in aluminum-lined bombs. The oxygen pressure in each bomb was adjusted to about 25 lbs. per sq. in. and the bombs agitated for about 48 hours. At the end of that time it was found that the mold in the bomb containing the culture medium to which no hydrogen peroxide had been added occupied a space of 1.5 mm. in a cylindrical vessel, when measured by the procedure described in Example 2. That grown in the culture medium containing hydrogen peroxide occupied a space of 4.5 mm. The stimulating effect of the hydrogen peroxide is apparent and since the amount of oxygen which could be evolved from such a small amount of hydrogen peroxide is entirely negligible, the experiment also shows that the stimulating effect is not attributable to the effect of additional oxygen evolved from the hydrogen peroxide.

Example 4

Two samples of Czapek's culture medium were prepared and to one of these samples hydrogen peroxide in amount equivalent to 0.05% by weight of the solution was added. Both samples were then inoculated with an Aspergillus type of mold and permitted to develop for twelve days.

At the end of that time the mycelium growth in each medium was removed and dried at room temperature and weighed. The weight of the mycelium growth in the solution containing hydrogen peroxide was 0.148 gram and the weight of the mold growth in the solution containing no hydrogen peroxide was 0.052 gram. This clearly shows the stimulating effect of hydrogen peroxide on mold growth.

It is to be understood that the invention is not restricted to the use of specific culture media, specific molds or definite proportions. It is of general utility and may be used wherever mold growth is to be stimulated. Moreover, the invention is not to be regarded as restricted to the manufacture of any selected chemical or other product by the action of molds, but is of broad general utility.

I claim:

1. A process of stimulating the growth of molds which comprises subjecting said molds during growth in a suitable medium to the action of hydrogen peroxide in amounts ranging from 0.01 to 0.08% by weight, based on the weight of the nutrient medium.

2. A process of stimulating the growth of molds which comprises subjecting said molds during growth in a suitable medium to the action of hydrogen peroxide in amounts ranging from 0.03 to 0.05% by weight, based on the weight of the nutrient medium.

WILBIE S. HINEGARDNER.